United States Patent
Takatani

(10) Patent No.: US 10,033,895 B2
(45) Date of Patent: Jul. 24, 2018

(54) PRINTING APPARATUS HAVING PLURALITY OF POWER STATES AND CONTROL METHOD THEREFOR

(71) Applicant: CANON KABUSHIKI KAISHA, Tokyo (JP)

(72) Inventor: Tamotsu Takatani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/297,233

(22) Filed: Oct. 19, 2016

(65) Prior Publication Data

US 2017/0041482 A1 Feb. 9, 2017

Related U.S. Application Data

(63) Continuation of application No. 14/867,113, filed on Sep. 28, 2015.

(30) Foreign Application Priority Data

Oct. 1, 2014 (JP) .................. 2014-203058

(51) Int. Cl.
*G06K 15/00* (2006.01)
*H04N 1/00* (2006.01)

(52) U.S. Cl.
CPC ..... *H04N 1/00896* (2013.01); *H04N 1/00477* (2013.01); *H04N 1/00885* (2013.01);
(Continued)

(58) Field of Classification Search
None
See application file for complete search history.

(56) References Cited

U.S. PATENT DOCUMENTS 6,753,973 B2   6/2004  Kimizuka et al.
7,171,569 B2*  1/2007  Ohishi .................. G06F 1/3203
                                                         713/300

(Continued)

FOREIGN PATENT DOCUMENTS

CN   101634821 A   1/2010
CN   101834966 A   9/2010

(Continued)

OTHER PUBLICATIONS

Office Action issued in U.S. Appl. No. 14/867,113, dated Mar. 16, 2016.

(Continued)

*Primary Examiner* — Dung D Tran
(74) *Attorney, Agent, or Firm* — Rossi, Kimms & McDowell LLP

(57) ABSTRACT

An image forming apparatus which is capable of selecting power states that suit user's intention for a low-power state and a job executable state. A first power-saving state or a second power-saving state in which a smaller amount of power is consumed than in the first power-saving state is set as a power-saving state to which the printing apparatus is shifted when a shifting factor is detected. A first returning method for returning the printing apparatus from the power-saving state when a returning factor that causes the printing apparatus to return from the power-saving state is detected, or a second returning method for returning the printing apparatus from the power-saving state when a function to be used is selected on a function selecting screen displayed in response to detecting the returning factor is set. When the first power-saving state has been set, the first returning method is set.

10 Claims, 8 Drawing Sheets

(52) U.S. Cl.
CPC ..... *H04N 1/00891* (2013.01); *H04N 1/00928* (2013.01); *H04N 2201/0094* (2013.01)

(56) References Cited

U.S. PATENT DOCUMENTS

| | | | |
|---|---|---|---|
| 7,633,636 | B2 | 12/2009 | Nagumo |
| 8,171,312 | B2 | 5/2012 | Nakamura |
| 8,248,629 | B2 | 8/2012 | Fukuda |
| 8,924,757 | B2 | 12/2014 | Itou |
| 9,152,359 | B2 | 10/2015 | Hontsu et al. |
| 9,571,673 | B2 * | 2/2017 | Inaba ................. H04N 1/00204 |
| 2009/0207423 | A1 | 8/2009 | Shimizu et al. |
| 2010/0037224 | A1 | 2/2010 | Hosoda |
| 2011/0004776 | A1 * | 1/2011 | Tanaka ............... H04N 1/00885 713/323 |
| 2011/0051166 | A1 | 3/2011 | Nishikawa |
| 2011/0273742 | A1 | 11/2011 | Takiguchi |
| 2012/0002236 | A1 | 1/2012 | Ebisui |
| 2012/0162692 | A1 | 6/2012 | Aida et al. |
| 2012/0257247 | A1 | 10/2012 | Yamasaki |
| 2013/0050727 | A1 | 2/2013 | Murata |
| 2013/0194602 | A1 | 8/2013 | Nagami |
| 2014/0006828 | A1 * | 1/2014 | Kanematsu ........... G06F 1/3234 713/323 |
| 2014/0218757 | A1 | 8/2014 | Konosu et al. |
| 2018/0027138 | A1 * | 1/2018 | Kawakami ......... H04N 1/00896 |

FOREIGN PATENT DOCUMENTS

| | | |
|---|---|---|
| CN | 103685817 A | 3/2014 |
| CN | 103780784 A | 5/2014 |
| JP | 2001201986 A | 7/2001 |

OTHER PUBLICATIONS

Notice of Allowance issued in U.S. Appl. No. 14/867,113, dated Jul. 19, 2016.
Office Action issued in Chinese Application No. 201510641975.7 dated Nov. 16, 2017. English translation provided.

* cited by examiner

PRINTING APPARATUS HAVING PLURALITY OF POWER STATES AND CONTROL METHOD THEREFOR

BACKGROUND OF THE INVENTION

Field of the Invention

The present invention relates to a printing apparatus and a control method therefor, and in particular to a power control technique for a printing apparatus having a plurality of power states.

Description of the Related Art

Conventionally, image forming apparatuses have a power state called a "low-power (power-saving) state" different from a job executing state and a job executable state so as to reduce power consumption while they are not operating. To return from the low-power state to the job executable state, initialization of each device is required, but it takes long to initialize some devices. For this reason, there is conventionally known an image forming apparatus which has some different low-power states and sets a state suitable for a processing time period required to initialize devices.

Specifically, in the low-power state, the power to devices of which initialization takes a long time is not turned off, and only the power to devices that can be quickly returned to the job executable state turned off. This speeds up the return to the job executable state although a greater amount of power is consumed than in a normal low-power state. As a result, a user is allowed to quickly obtain an output result of printing or the like from the image forming apparatus in the low-power state.

Japanese Laid-Open Patent Publication (Kokai) No. 2001-201986 describes a technique to turn off the power to devices even in the job executable state so as to reduce power consumption. In this case, when a user issues an instruction to execute a job, the power to a device required for the job is turned on.

However, according to Japanese Laid-Open Patent Publication (Kokai) No. 2001-201986, a device is initialized when a job is to be executed, and hence it takes a long time before execution of the job. Namely, according to Japanese Laid-Open Patent Publication (Kokai) No. 2001-201986, greater importance is placed on saving of power in the job executable state than on shortening of the time period that elapses before execution of a job. On the other hand, the above described technique by which the power to devices of which initialization takes a long time is kept on, and the power to devices that can be initialized within a short time is turned off in the low-power state places greater importance on shortening of the time period before execution of a job than on saving of power in the low-power state.

Therefore, using both of these techniques for an image forming apparatus will bring about a situation in which two purposes, i.e. shortening of the time period before execution of a job in the low-power state and saving of power in the job executable state are mutually contradictory, and power may not be controlled in an appropriate manner as intended by a user.

SUMMARY OF THE INVENTION

The present invention provides a printing apparatus and a control method therefor, which are capable of selecting power states that suit user's intention for a low-power state and a job executable state.

Accordingly, the present invention provides a printing apparatus, comprising a first setting unit configured to set a first power-saving state or a second power-saving state in which a smaller amount of power is consumed than in the first power-saving state as a power-saving state to which the printing apparatus is shifted when a shifting factor that causes the printing apparatus to shift to the power-saving state is detected, a second setting unit configured to set, as a returning method for returning the printing apparatus from the power-saving state, a first returning method for returning the printing apparatus from the power-saving state when a returning factor that causes the printing apparatus to return from the power-saving state is detected, or a second returning method for returning the printing apparatus from the power-saving state when a function to be used is selected on a function selecting screen displayed in response to detecting the returning factor, and a control unit configured to perform control so that the second setting unit sets the first returning method when the first setting unit sets the first power-saving state.

According to the present invention, in a case where the first power-saving state between the first power-saving state and the second power-saving state in which a smaller amount of power is consumed than in the first power-saving state is set and the returning factor is detected, the printing apparatus returns from the power-saving state. As a result, power states that suit user's intention can be selected for the low-power state and the job executable state.

Further features of the present invention will become apparent from the following description of exemplary embodiments (with reference to the attached drawings).

DESCRIPTION OF THE EMBODIMENTS

The present invention will now be described with reference to the drawings showing an embodiment thereof.

Figure 1:
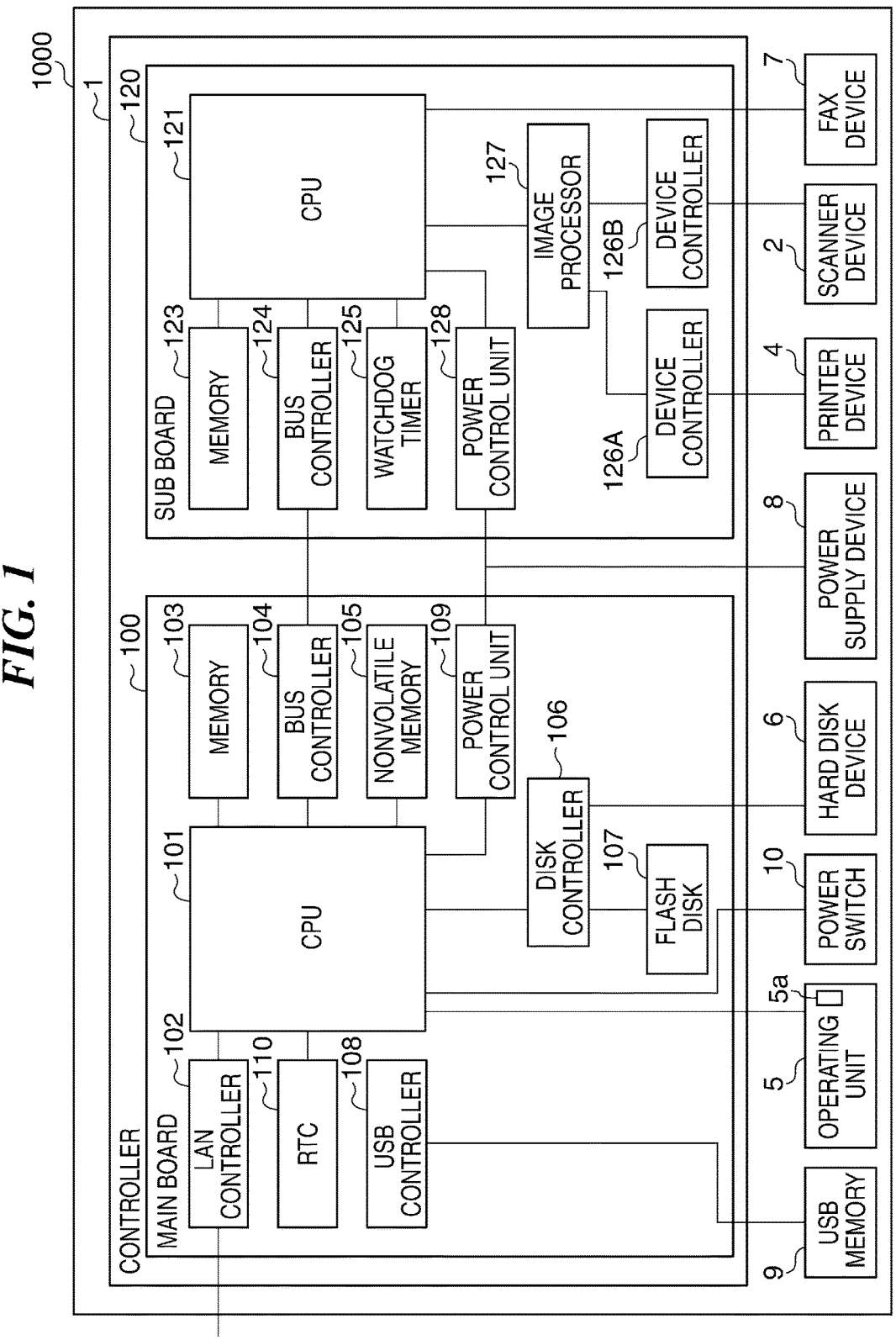
FIG. 1 is a block diagram showing an image forming apparatus as a printing apparatus according to an embodiment of the present invention.

FIG. 1 is a block diagram showing an image forming apparatus as a printing apparatus according to an embodiment of the present invention. This image forming apparatus 1000 is configured as, for example, a multifunctional peripheral having a scanner function, a printer function, and a facsimile function. The image forming apparatus 1000 has a controller 1 which is a module, and the controller 1 is comprised of a main board 100 and a sub board 120.

The main board 100 is what is called a universal CPU system. The main board 100 has a CPU 101 which controls the entire board, a LAN controller 102 which carries out communication with external equipment via a network, and a memory 103 which is used as a work memory by the CPU 101. The main board 100 also has a bus controller 104 which acts as a bridge to an external bus, a nonvolatile memory 105 from which stored data is not erased even when the power is shut down, and an RTC 110 which is able to continue keeping time using a battery even when the power is shut down. The main board 100 also has a disk controller 106 which controls a storage device, a flash disk 107 which is a storage device such as an SSD with a relatively small capacity which is comprised of a semiconductor device, a USB controller 108 which controls a USB memory 9, a power control unit 109, and so forth.

The USB memory 9, an operating unit 5, a power switch 10, and a hard disk device 6 are connected to the main board 100. A storage device other than the hard disk device 6 may be adopted insofar as it is a nonvolatile device. The operating unit 5 receives various operations from a user and includes a low-power shift return button 5a. The operating unit 5 also includes a display unit which produces screen displays.

A sub board 120 is comprised of a relatively small universal CPU system and image processing hardware. The sub board 120 has a CPU 121 which controls the entire board, a memory 123 which is used as a work memory by the CPU 121, a bus controller 124 which acts as a bridge to an external bus, and a watchdog timer 125. The sub board 120 also has an image processor 127 which performs real-time digital image processing, device controllers 126A and 126B, and a power control unit 128. A printer device 4 and a scanner device 2 send and receive digital image data to and from the image processor 127 via the device controllers 126A and 126B. A FAX device 7 is directly controlled by the CPU 121.

Power to the main board 100 and the sub board 120 is supplied from a power supply device 8. The power control units 109 and 128 manage supply of power to components of the main board 100 and the sub board 120 for which power is required. The power switch 10 receives power on/off operations from a user, and when the power switch 10 is operated, an interrupt signal is sent to the CPU 101. Upon detecting the interrupt signal, the CPU 101 controls the power control unit 109 in accordance with a condition at that time. The CPU 121 also detects operation on the power switch 10 via the bus controllers 104 and 124 and controls the power control unit 128.

It should be noted that FIG. 1 is a simplified one since it is a block diagram. For example, the CPU 101, the CPU 121, and so on include a number of pieces of CPU-peripheral hardware such as a chipset, a bus bridge, and a clock generator, but they are not shown in the figure, and this block configuration should not restrict the present invention.

A description will now be given of how the controller 1 operates by taking copying of an image to a sheet device as an example. When a user issues a copying instruction to the operating unit 5, the CPU 101 sends an image reading instruction to the scanner device 2 via the CPU 121. The scanner device 2 optically scans a sheet original, converts an image obtained by scanning to digital image data, and inputs the digital image data to the image processor 127 via the device controller 126B. The image processor 127 carries out DMA transfer to the memory 123 via the CPU 121 to temporarily store the digital image data.

Upon ascertaining that a predetermined amount or all of digital image data has been stored in the memory 123, the CPU 101 issues an image output instruction to the printer device 4 via the CPU 121. The CPU 121 informs the image processor 127 of a position of the image data on the memory 123. In accordance with a synchronization signal from the printer device 4, the image data on the memory 123 is sent to the printer device 4 via the image processor 127 and the device controller 126A, and the digital image data is printed on a sheet device by the printer device 4.

To print a plurality of copies, the CPU 101 stores image data on the memory 123 in the hard disk 6, and hence for the second and subsequent copies, an image is allowed to be sent to the printer device 4 without receiving image data from the scanner device 2.

FIGS. 2A to 2D are views showing exemplary power mode setting screens which are displayed on the operating unit 5. In the present embodiment, a plurality of power modes is allowed to be set for the image forming apparatus 100. In particular, power modes are allowed to be set for each of a job executable state and a low-power state. In the low-power state, a smaller amount of power is consumed than in the job executable state. The power modes in the low-power state include a power-saving mode (first mode) and a sleep mode (second mode). The power modes in the low-power state include an eco-return ON mode (third mode) and an eco-return OFF mode (fourth mode).

The "low-power state" is in principle a state in which processing of a job cannot be started without undergoing initialization of devices. However, even for the low power state, the power-saving mode is provided in addition to the sleep mode so as to reduce the time that elapses before starting of a job. In the power-saving mode, the speed at which a job such as printing is processed is given higher priority than in the sleep mode. The power to predetermined devices is kept off in the sleep mode, but is kept on in the power-saving mode. Therefore, operation of the predetermined devices is allowed to be started without performing initialization thereof. It is assumed here that in the present embodiment, the "predetermined devices" are the printer device, 4, the scanner device 2, and the fax device 7, but this is not limitative.

The "job executable state" is in principle a state in which processing of a job is allowed to be started immediately after a job executing instruction is received, and in general, synonymous with a standby state. However, even for the job executable state, the eco-return ON mode is provided in addition to the eco-return OFF mode so as to save power and reduce noise. The power to the predetermined devices is kept off in the eco-return OFF mode, whereas in the eco-return ON mode, when a job to be executed is determined with the power off, the power to a device suitable for the job is turned on. Thus, in the eco-return ON mode, the power to a necessary device is turned on at the time a job to be executed is determined, that is, at the time a function to be used is determined.

The power-saving mode and the eco-return ON mode are mutually contradictory in terms of purposes, and hence if they are selected at the same time, this is likely to be against user's intention. Accordingly, the controller 1 selects one of the following combinations of power modes: a combination of the power-saving mode and the eco-return OFF mode and a combination of the sleep mode and the eco-return ON mode. How to provide control therefor will be described later with reference to FIGS. 5 to 7.

When the low-power shift return button 5a (shifting factor) is depressed in the job executable state, the image forming apparatus 1000 shifts from the job executable state into the low power state. When the low-power shift return button 5a (returning factor) is depressed in the low-power state, the image forming apparatus 1000 shifts from the low-power state to the job executable state.

Figure 2A:
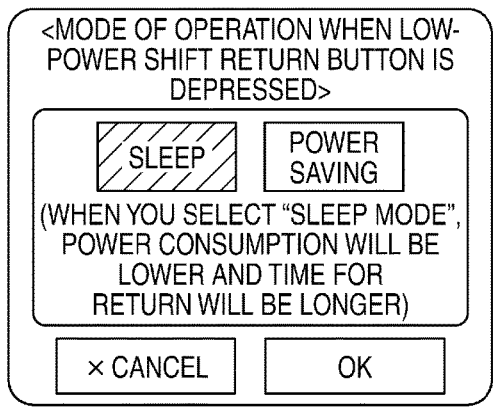
FIGS. 2A to 2D are views showing exemplary power mode setting screens.
Figure 2B:
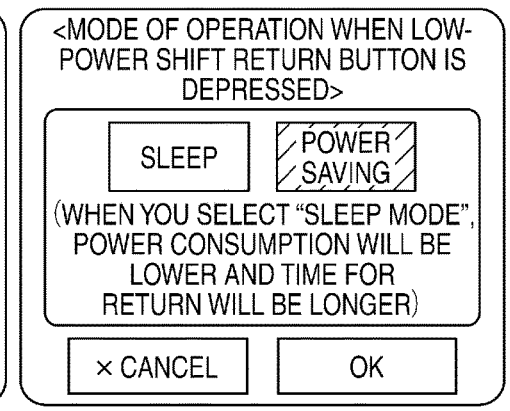

When the image forming apparatus 1000 has shifted from the job executable state to the low-power state, the power mode setting screen in FIG. 2A or 2B for the low-power state is displayed on the display of the operating unit 5. A state in which the sleep mode is selected as a power mode for the low-power state and a state in which the power-saving mode is selected as a power mode for the job executable state are shown in FIGS. 2A and 2B, respectively. By a user depressing a sleep or power-saving button, a setting is allowed to be changed, and when an OK button is depressed, the setting is accepted.

Figure 2C:
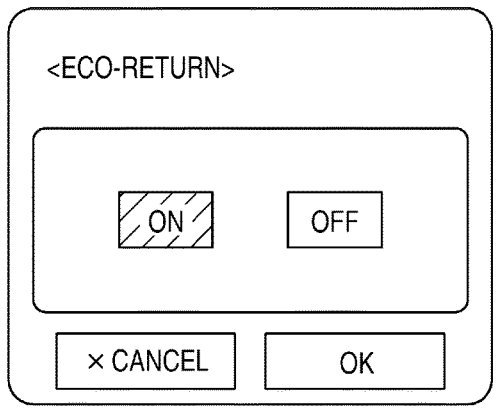
Figure 2D:
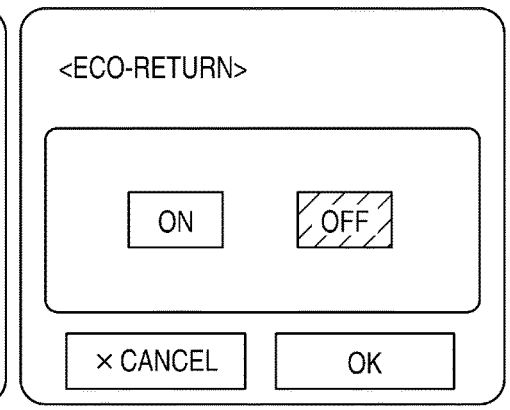

When the image forming apparatus 1000 has shifted from the low-power state to the job executable state, the power mode setting screen in FIG. 2C or 2D for the job executable state is displayed on the display of the operating unit 5. A state in which the eco-return ON mode is selected and a state in which the eco-return OFF mode is selected are shown in FIGS. 2C and 2D, respectively. By depressing an ON or OFF button, a setting is allowed to be changed, and when an OK button is depressed, the setting is accepted. The CPU 101 and the operating unit 5 correspond to a setting unit of the present invention.

Figure 3A:
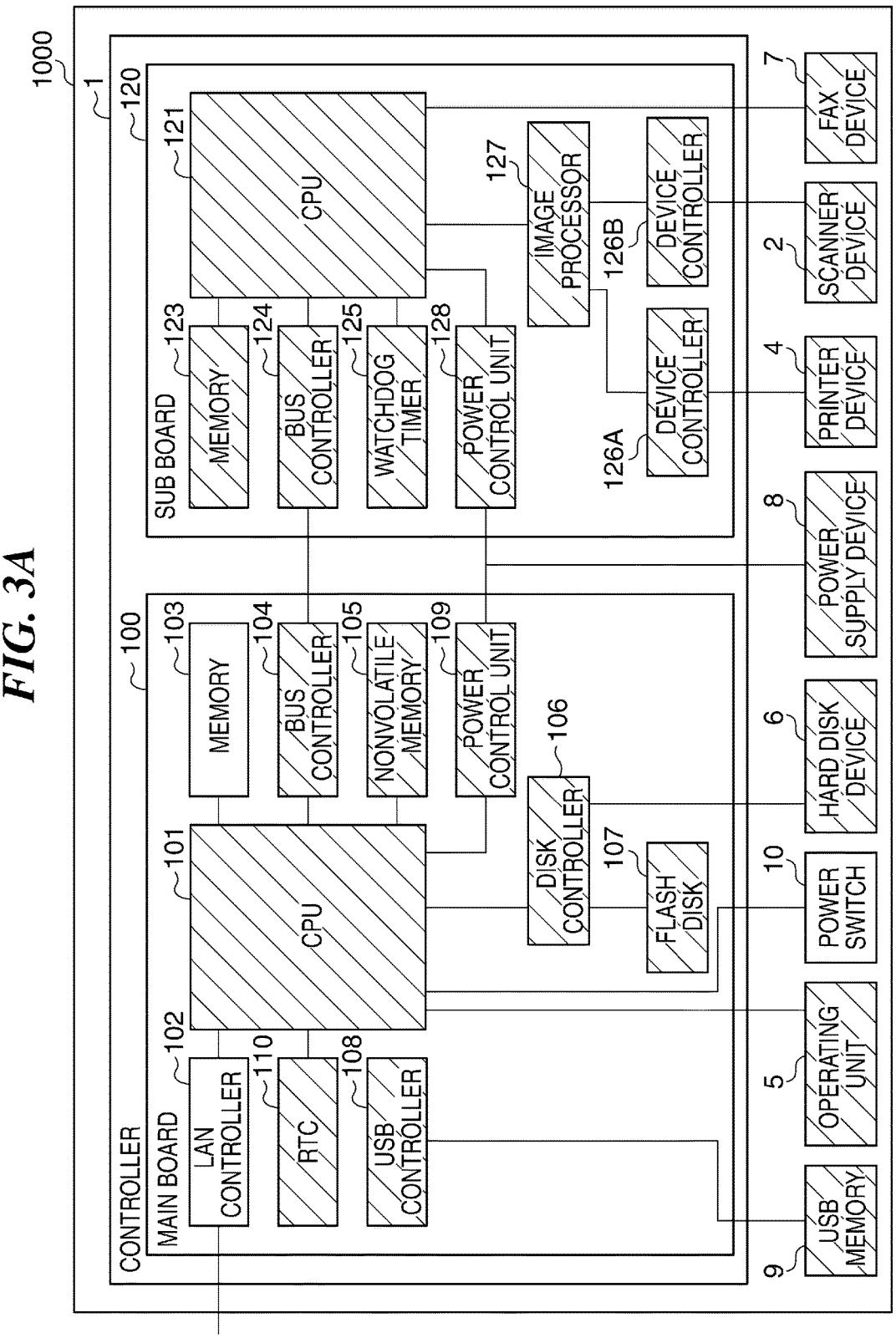
FIG. 3A is a block diagram showing an energized state in a sleep mode.
Figure 3B:
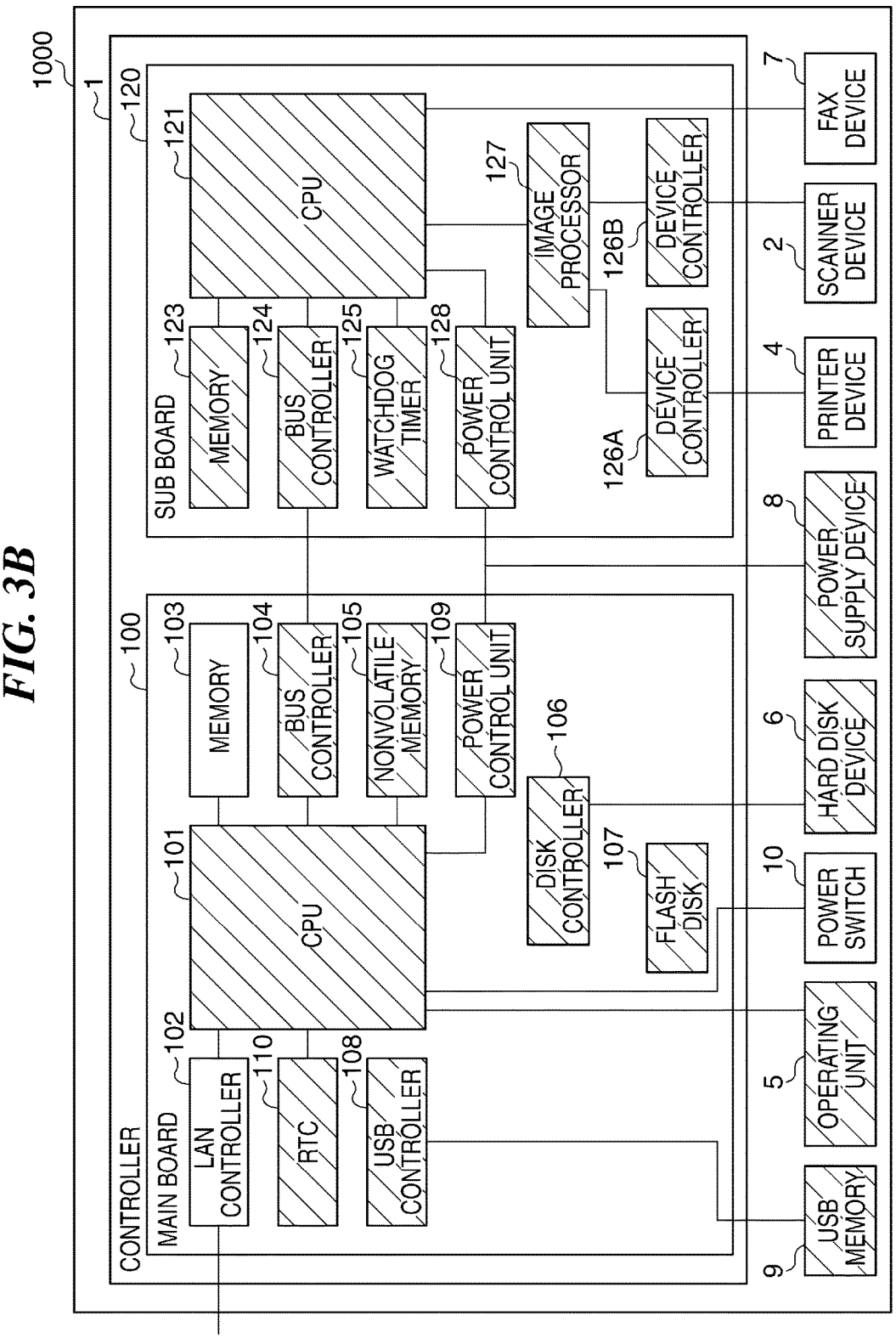
FIG. 3B is a block diagram showing an energized state in a power-saving mode.

FIGS. 3A and 3B are block diagrams showing energized states in the sleep mode and the power-saving mode, respectively. Power is supplied to at least blocks that are not hatched in FIGS. 3A and 3B.

In the sleep mode (FIG. 3A), the low-power shift return button 5a of the operating unit 5 and the LAN controller 102 are energized because they are minimum hardware required to return from the low-power state. On the other hand, in the power-saving mode (FIG. 3B), the printer device 4, the scanner device 2, and the FAX device 7, which are the predetermined devices described above, as well as the low-power shift return button 5a of the operating unit 5 and the LAN controller 102 are energized, because it takes a long time to initialize these devices.

Figure 4:
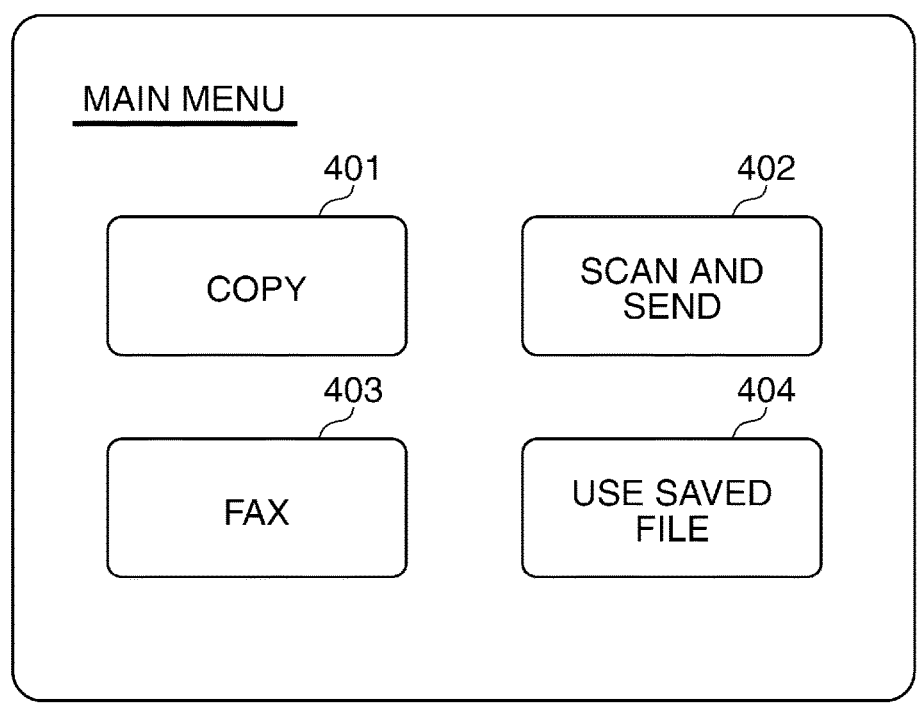
FIG. 4 is a view showing an exemplary function selection screen in an eco-return ON mode.

FIG. 4 is a view showing an exemplary function selection screen which is displayed on the operating unit 5 in the eco-return ON mode.

When the image forming apparatus 1000 has shifted into the eco-return ON mode, the function selection screen in FIG. 4 is displayed. When a user selects a function to be used on the function selection screen, power is supplied to a device for the selected function. Determination of a function to be used means determination of a job to be executed.

For example, when a Copy button 401 is selected, it is necessary to perform an original reading function and a printing function so as to carry out a copying process. Accordingly, the controller 1 turns on the power to the printer device 4 and the scanner device 2. When a Scan and Send button 402 is selected, it is necessary to perform the original reading function so as to carry out a scanning process. Accordingly, the controller 1 turns on the power to the scanner device 2. When a FAX button 403 is selected, it is necessary to perform the original reading function and a faxing function so as to carry out a faxing process. Accordingly, the controller 1 turns on the power to the scanner device 2 and the FAX device 7. When Use a Saved File button 404 is selected, it is necessary to perform the printing function. Accordingly, the controller 1 turns on the power to the printer device 4.

The power to devices that need not to be operated for a selected function is kept off. It should be noted that when the eco-return OFF mode is set for the image forming apparatus 1000, the power to all the devices is on, and hence power supply control based on a selected function is not provided.

Figure 5:
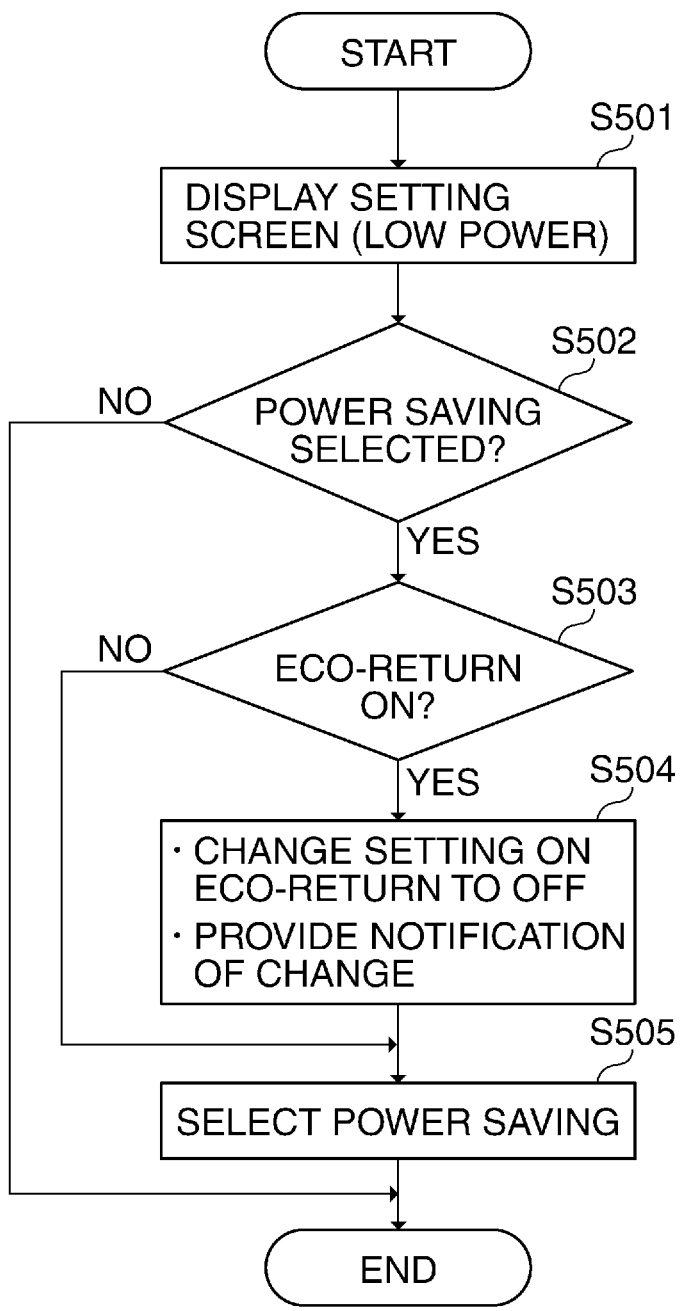
FIG. 5 is a flowchart showing a power mode changing process in a low power state.

FIG. 5 is a flowchart showing a power mode changing process for the low-power state. This process is started when the image forming apparatus 1000 has shifted into the low-power state in response to the low-power shift return button 5a being depressed in the job executable state, and is carried out by the CPU 101 of the main board 100.

First, in step S501, the CPU 101 displays the power mode setting screen (FIG. 2A or 2B) for the low-power state on the operating unit 5. In step S502, the CPU 101 determines whether or not the power-saving mode has been selected between the sleep mode and the power-saving mode on the power mode setting screen. As a result of the determination in the step S502, when the sleep mode has been selected, the CPU 101 terminates the process in FIG. 5 without changing any settings. On the other hand, when the power-saving mode has been selected, the process proceeds to step S503, in which the CPU 101 in turn determines whether or not the eco-return ON mode has been selected as a power mode for the job executable state between the eco-return ON mode and the eco-return OFF mode.

As a result of the determination in the step S503, when the eco-return ON mode has been selected, the process proceeds to step S504, in which the CPU 101 in turn forcibly changes the power mode for the job executable state to the eco-return OFF mode and provides a notification (FIG. 7A), to be described later.

Figure 7A:
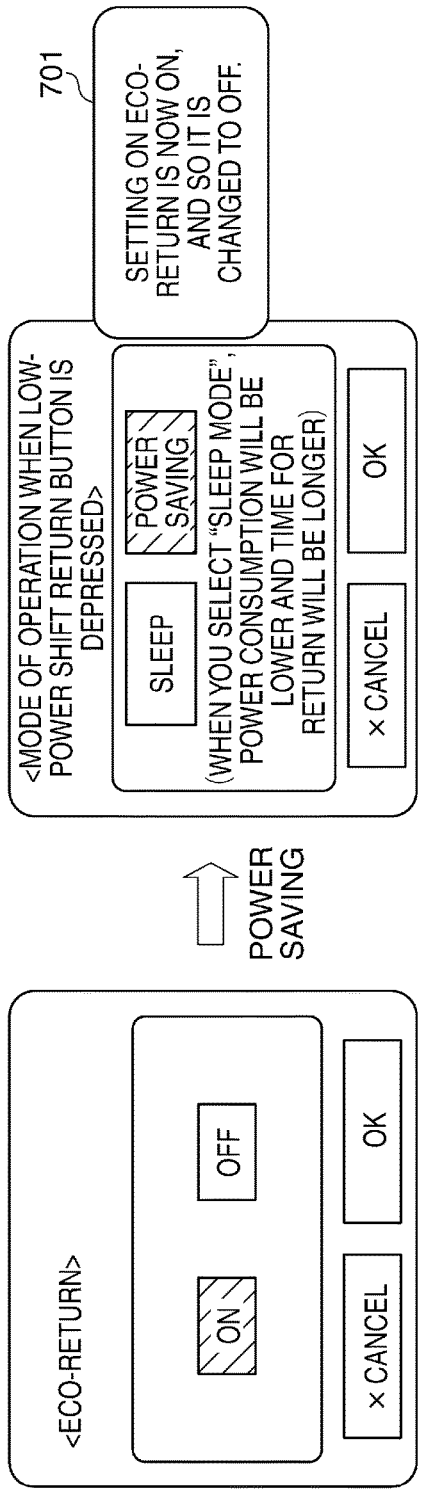
FIGS. 7A and 7B are views showing exemplary screens which provide notification about changing of modes.

FIG. 7A is a view showing an exemplary screen which provides notification that the power mode changes from the eco-return ON mode to the eco-return OFF mode when the power mode changes from the sleep mode to the power-saving mode. When the power mode changes from the sleep mode to the power-saving mode, different power mode setting screens are displayed in the low-power state (FIGS. 2A and 2B) and the job executable state (FIGS. 2C and 2D), and a setting is changed in a form like a background process. For this reason, the user may not be aware of this change. Accordingly, by displaying a popup 701, the CPU 101 informs the user that the power mode changes to the eco-return OFF mode.

After that, in step S505, the CPU 101 changes the power mode for the low-power state from the sleep mode to the power-saving mode. Thus, the notification in FIG. 7A is provided at the time the setting on the power mode is changed. The process in FIG. 5 is then terminated.

On the other hand, as a result of the determination in the step S503, when the eco-return OFF mode is selected, the CPU 101 executes the step S505 while maintaining the eco-return OFF mode.

Figure 6:
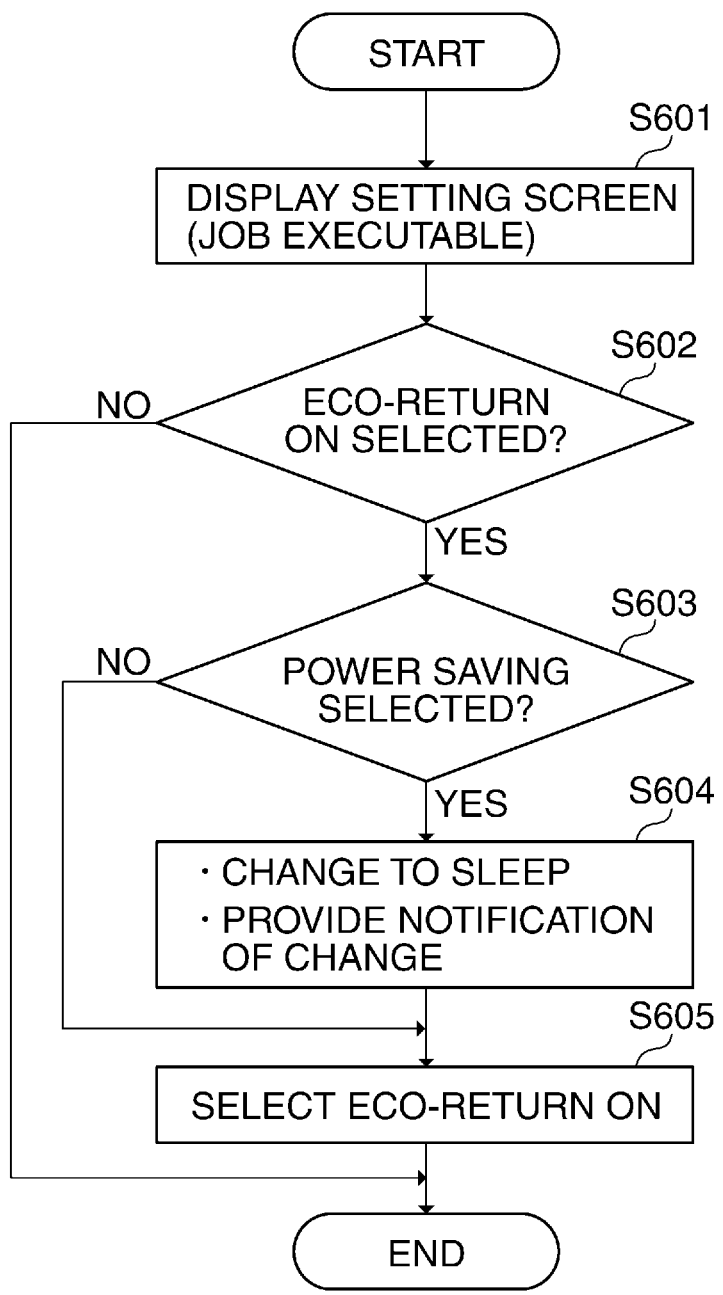
FIG. 6 is a flowchart showing a power mode changing process in a job executable state.

FIG. 6 is a flowchart showing a power mode changing process in the job executable state. This process is started when the image forming apparatus 1000 has shifted into the job executable state in response to the low power shift return button 5a being depressed in the low power state, and is carried out by the CPU 101 of the main board 100.

First, in step S601, the CPU 101 displays the power mode setting screen (FIG. 2C or 2D) for the job executable state on the operating unit 5. In step S602, the CPU 101 determines whether or not the eco-return ON mode has been selected between the eco-return ON mode and the eco-return OFF mode on the power mode setting screen. As a result of the determination in the step S602, when the eco-return OFF mode has been selected, the CPU 101 terminates the process in FIG. 6 without changing any settings. On the other hand, when the eco-return ON mode has been selected, the process proceeds to step S603, in which the CPU 101 in turn determines whether or not the power-saving mode has been selected as a power mode for the low-power state between the sleep mode and the power-saving mode.

As a result of the determination in the step S603, when the power-saving mode has been selected, the process proceeds to step S604, in which the CPU 101 in turn forcibly changes the power mode for the low-power state to the sleep mode and provides a notification (FIG. 7B), to be described later.

Figure 7B:
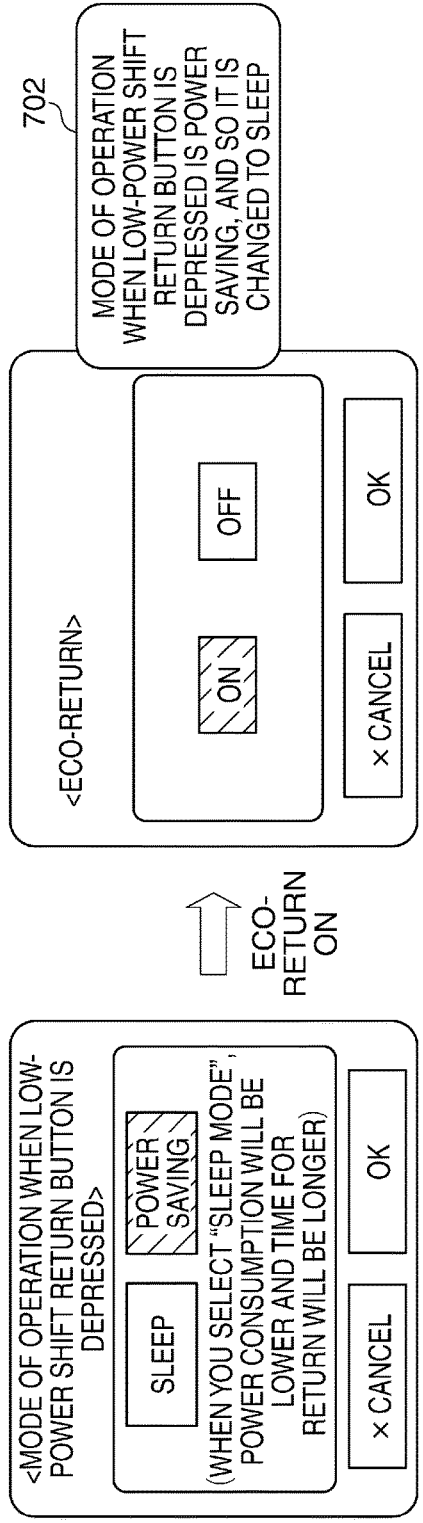

FIG. 7B is a view showing an exemplary screen which provides notification that the power mode changes from the power-saving mode to the sleep mode when the power mode changes from the eco-return OFF mode to the eco-return ON mode. A described above, different power mode setting screens are displayed in the low-power state and the job executable state, and hence the user may not be aware of this change. For this reason, as shown in FIG. 7B, by displaying a popup 702, the CPU 101 informs the user that the power mode changes to the sleep mode.

After that, in step S605, the CPU 101 changes the power mode for the job executable state from the eco-return OFF mode to the eco-return ON mode. Thus, the notification in FIG. 7B is provided at the time the setting on the power mode is changed. After that, the process in FIG. 6 is terminated. On the other hand, as a result of the determination in the step S603, when the sleep mode has been selected, the CPU 101 executes the step S605 while maintaining the sleep mode.

According to the present embodiment, when changing the power mode for the low-power state from the sleep mode to the power-saving mode, the CPU 101 also changes the power mode for the job executable state from the eco-return ON mode to the eco-return OFF mode. Also, when changing the power mode for the job executable state from the eco-return OFF mode to the eco-return ON mode, the CPU 101 also changes the power mode for the low-power state from the power-saving mode to the sleep mode.

As a result, one of the following combinations of power modes is selected: a combination of the power-saving mode and the eco-return OFF mode, and a combination of the sleep mode and the eco-return ON mode. This prevents a combination of modes which are mutually contradictory in terms of purposes from being selected and achieves a balance between saving of power and shortening of the time that elapses before execution of a job. As a result, power states intended by a user are allowed to be selected for the low-power state and the job executable state.

Moreover, at the time the CPU 101 changes the power mode from the sleep mode to the power-saving mode, it provides notification that the power mode changes from the eco-return ON mode to the eco-return OFF mode. Further, at the time the CPU 101 changes the power mode from the eco-return OFF mode to the eco-return ON mode, it provides notification that the power mode changes from the power-saving mode to the sleep mode. This clearly informs a user of modes that change in response to instructions from the user.

It should be noted that although as a way of providing notification about changing of modes, a popup display is illustrated by example, this is not limitative. For example, changing of modes may be indicated on an additional display, or notification may be provided by voice.

It should be noted that the present invention may be applied to any image forming apparatuses insofar as they have a plurality of devices which operate to execute a job, and the devices should not be limited to those having functions of a printer, a scanner, and facsimile.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-203058, filed Oct. 1, 2014, which is hereby incorporated by reference herein in its entirety.

What is claimed is:

1. A printing apparatus, comprising:
   a device;
   a printer configured to print an image on a sheet; and
   a controller configured to,
   in accordance with an instruction for shifting the printing apparatus into a low-power state, shift the printing apparatus into a first power-saving state in which power is supplied to a part of the printer and power is not supplied to the device or a second power-saving state in which power is not supplied to the part of the printer and the device based on first setting value set in advance, and,
   in accordance with a predetermined instruction for shifting the printing apparatus into a high-power state in the second power-saving state, shift the printing apparatus from the second power-saving state into a first power state in which power is supplied to the part of the printer and the device or a second power state in which power is not supplied to the part of the printer and power is supplied to the device based on a second setting value set in advance,
   wherein the controller prohibits the printing apparatus from being shifted from the first power-saving state into the second power state in accordance with the predetermined instruction in the first power-saving state.

2. The printing apparatus according to claim 1, wherein the controller is configured to shift the printing apparatus from the first power-saving state into the first power state in accordance with the predetermined instruction in the first power-saving state.

3. The printing apparatus according to claim 1, wherein the controller is configured to enable an eco-return function for shifting the printing apparatus into the second power state in accordance with the predetermined instruction, and the controller is configured to disable the eco-return function while the printing apparatus is in the first power-saving state.

4. The printing apparatus according to claim 1, wherein an initialization process for setting the printer to a state in which the printer is ready for printing is performed, in a case where the controller shifts the printing apparatus from the second power-saving state into the first power state.

5. The printing apparatus according to claim 4, further comprising a display,
wherein the controller is configured to control the display to display an initial screen in accordance with the predetermined instruction in the first power-saving state, and
wherein the printer is configured to perform the initialization process in accordance with a user operation on the initial screen.

6. The printing apparatus according to claim 5,
wherein the initial screen is a function selecting screen for selecting an arbitrary function from among a plurality of functions including a printing function, and
wherein the printer is configured to perform the initialization process in accordance with a selection of the printing function displayed on the function selecting screen.

7. The printing apparatus according to claim 4, wherein the initialization process is not performed, in a case where the controller shifts the printing apparatus from the second power-saving state into the second power state.

8. The printing apparatus according to claim 1, further comprising a button configured to receive from a user the predetermined instruction for shifting the printing apparatus into the high-power state.

9. The printing apparatus according to claim 8, wherein the button is further configured to receive the instruction for shifting the printing apparatus into the low-power state.

10. A control method for controlling a printing apparatus including a device, a printer that prints an image on a sheet, and a controller, the control method comprising:
using the controller to, in accordance with an instruction for shifting the printing apparatus into a low-power state, control shifting of the printing apparatus into a first power-saving state in which power is supplied to a part of the printer and power is not supplied to the device or a second power-saving state in which power is not supplied to the part of the printer and the device based on a first setting value set in advance, and,
in accordance with a predetermined instruction for shifting the printing apparatus into a high-power state in the second power-saving state, control shifting of the printing apparatus from the second power-saving state into a first power state in which power is supplied to the part of the printer and the device or a second power state in which power is not supplied to the part of the printer and power is supplied to the device based on a second setting value set in advance,
wherein the controller prohibits the printing apparatus from being shifted from the first power-saving state into the second power state in accordance with the predetermined instruction in the first power-saving state.

* * * * *